United States Patent Office 2,770,077
Patented Nov. 13, 1956

2,770,077

SOIL CONDITIONING WITH ALKENYL SUCCINIC COMPOUNDS

Keith L. Smith, Charleston, W. Va., assignor to Union Carbide and Carbon Corporation, a corporation of New York No Drawing. Application October 14, 1954,
Serial No. 462,357

9 Claims. (Cl. 47—58)

The present invention relates to methods of improving the granule stability of surface soils.

The problems encountered in the conditioning of soils have been discussed heretofore in U. S. Patent No. 2,625,529, issued January 13, 1953, to R. M. Hedrick and D. T. Mowry. According to this disclosure, the tilth of surface soils is improved by mixing the soil with a small amount of synthetic water-soluble polymers having average molecular weights in excess of 10,000.

According to this invention, a class of materials for soil conditioning has been found which are relatively low molecular weight products compared to the above-described polymers and which are not necessarily water-soluble. Despite their difference in character from the polymers previously used, these materials have the ability to stabilize soil granules against the action of water and otherwise condition the soil to improve its tilth. The undesirable action of water on soil granules includes several processes. Initially water causes the soil granules to break down or slake to primary soil particles or smaller granules. Secondly, these primary soil particles and very small soil granules tend to plug the capillary pores in the soil. Such plugging adversely affects the drainage, aeration, friability and erosion resistance of the soil. In soils of high granule stability, these effects are less pronounced. By incorporating small amounts of the materials of this invention in the soil, its granule stability can be markedly improved. The materials of this invention have the advantage of being easy to apply and to work into the soil, since they are either free-flowing liquids or water-soluble solids which can readily be applied in aqueous solution. In addition, they are relatively inexpensive, which enhances their widespread adaptability.

The materials of this invention comprise the class of alkenyl succinic acids and anhydrides and their salts in which the alkenyl radicals contain from five to eight carbon atoms. The anhydride may be represented by the formula

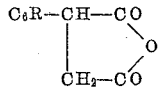

where the radical may be any alkenyl radical containing from five to eight carbon atoms, either normal or branched chain, and in which the double bond is in any of the available positions. The acids and their salts will have the corresponding functional structures. The salts may be either the neutral salt or the acid salt, depending upon whether one or both carboxyl groups are neutralized.

The preferred materials of the invention have the double bond of the alkenyl radical in the alpha position, particularly when the radical is highly branched, and when in anhydride form are represented by the structure:

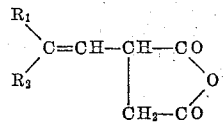

where $R_1$ is hydrogen or an alkyl radical, and $R_2$ is an alkyl radical, the sum of the carbon atoms in $R_1$ and $R_2$ being from three to six. Thus $R_1$ can be hydrogen and $R_2$ can be a propyl, butyl, amyl or hexyl radical; or $R_1$ can be methyl, ethyl, propyl, butyl or amyl radical, and $R_2$ can be any complementary alkyl radical such that the sum of the carbon atoms in $R_1$ and $R_2$ will be from three to six.

The alkenyl succinic anhydrides are readily made by the reaction of five to eight carbon olefines, such as pentene-2, hexene-1, 1-ethylbutene-1, heptene-2 or octene-2, with maleic anhydride. The alkenyl succinic acids are derived from the anhydrides by hydrolysis, and the salts are formed by neutralization of the acids or anhydrides with a basic metal hydroxide, ammonium hydroxide or an amine.

Water solubility does not appear to be an essential requirement for a soil granule stability effect, since the alkenyl succinic anhydrides are water-insoluble, whereas the acids and most salts are water-soluble. In either case, application of the soil conditioner to the soil is quite simple as the anhydrides are free-flowing liquids and the acids and salts, while solids, can readily be applied in aqueous solutions.

One method of evaluating the effectiveness of a soil conditioner in improving the stability of soil granules to the action of water is the soil granule retention test described below.

SOIL GRANULE RETENTION TEST 50 grams of soil were mixed with five ccs. of distilled water and sufficient soil conditioner chemical to give the desired concentration, based on the dry soil weight. In no case was water added in excess of the plastic limit of the soil in question. Previous to mixing the soil had been dried at 70° C. under vacuum and ground to pass a 20-mesh sieve. After mixing with water and treatment chemical, the soil was placed in an air dryer and dried at room temperature and atmospheric pressure. The treated soil sample was then dry-sieved through a 60-mesh screen to remove fine material. Twenty-five grams of the portion remaining on the 60-mesh sieve was placed in a one-liter cylinder containing 600 ccs. of distilled water, upended once, and allowed to stand for 30 minutes. The cylinder was then upended 30 times and its contents dumped onto a 60-mesh sieve. The 60-mesh sieve and its contents were then lowered into and out of a pan of distilled water thirty times. The dry weight of the soil remaining on the 60-mesh sieve after these operations, divided by twenty-five grams, times 100, is reported as the percent soil granule retention.

Soil granule retention tests were conducted on a Calhoun silt soil, and on a Miami silt loam soil, which have very poor natural stability, using alkenyl succinic anhydrides and various derivatives thereof. A commercial material "Krilium" 6, reported to be the mixed sodium-calcium salt of a vinyl acetate-maleic anhydride resinous copolymer, was also tested for comparison. The results of the tests are given in Table I and Table II.

Table I.—*Granule stability of Calhoun silt soil treated with 2-ethylbutenyl succinic anhydride and derivatives (0.1% on dry soil weight)*

| Treatment Material | Granule Retention, Percent |
|---|---|
| Control, no treatment | 2.6 |
| 2-Ethylbutenyl-1 Succinic Anhydride | 90.3 |
| 2-Ethylbutenyl-1 Succinic Acid | 81.7 |
| Sodium Salt of 2-Ethylbutenyl-1 Succinic Acid | 72.4 |
| Calcium Salt of 2-Ethylbutenyl-1 Succinic Acid | 68.1 |
| "Krilium" 6 | 44.2 |

*Table II.—Granule stability of Miami silt loam soil treated with various alkenyl succinic anhydrides (0.1% on dry soil weight)*

| Treatment Material | Granule Retention, Percent |
| --- | --- |
| Control, no treatment | 21.7 |
| Pentene-2 reacted with maleic anhydride | 93.9 |
| Hexene-2 reacted with maleic anhydride | 82.3 |
| Heptene-2 reacted with maleic anhydride | 91.0 |
| Octene-2 reacted with maleic anhydride | 79.2 |
| Hexene-1 reacted with maleic anhydride | 89.6 |
| Heptene-3 reacted with maleic anhydride | 83.6 |
| 2-Methylbutene-1 reacted with maleic anhydride | 94.0 |
| 2-Methylbutene-2 reacted with maleic anhydride | 93.4 |
| 2-Ethylbutene-1 reacted with maleic anhydride | 92.3 |
| 4-Methylpentene-1 reacted with maleic anhydride | 93.5 |
| 4-Methylpentene-2 reacted with maleic anhydride | 92.9 |
| 2,4,4-Trimethylpentene-1 reacted with maleic anhydride | 89.6 |
| 2,4,4-Trimethylpentene-2 reacted with maleic anhydride | 68.5 |
| "Krilium" 6 | 52.2 |

The effectiveness of a soil conditioner is also dependent on the concentration used on the soil weight. The agents of this invention are effective at low concentrations, and they approach their maximum effectiveness at concentrations lower than is the case with other commercially used soil conditioners. The data in Table III below shows the effect of concentration of the conditioner on the soil granule stability.

*Table III.—Effect of concentration of treatment material on the granule stability of Calhoun silt*

| Material Concentration on Dry Soil Weight, Percent | Percent Granule Retention | |
| --- | --- | --- |
| | 2-Ethylbutenyl-1 Succinic Anhydride | "Krilium" 6 |
| None | 2.6 | 2.6 |
| 0.005 | 4.1 | 16.7 |
| 0.01 | 14.2 | 19.1 |
| 0.05 | 66.6 | 45.2 |
| 0.1 | 81.7 | 44.2 |
| 0.2 | | 63.4 |

On the basis of this test, concentrations of the hexenyl succinic anhydride higher than 0.1% to 0.2% are not required, but in special instances amounts as high as 1% might be beneficial, considering only soil granular stability. However, where plants are to be grown in the treated soil, it has been found that soils having a concentration of the conditioner in excess of about 0.05% exhibit phytotoxicity, particularly on light textured soils. Therefore, for agricultural purposes, the useful concentration of the conditioner is below 0.05%, and even at these levels, a marked improvement in soil granular stability is obtained, as shown in Table III above. For conditioning non-agricultural soils, for example to control erosion, higher concentrations of the alkenyl succinic anhydrides may be used.

The effect of soil conditioners in improving soil granule stability varies with the type of soil, and the action of the soil conditioning agents of this invention is in apparent accord with this rule. Furthermore, testing of a soil conditioner with only a few types of soils will not adequately characterize soil conditioner action generally. Soils are classified according to texture class and soil series, one such classification by texture being as follows:

CLASSIFICATION OF SOILS

Sands  
Loamy sands  
Sandy loams  
Sandy clay loams  
Loams  
Silt loams  
Silts  
Silty clay loams  
Silty clays  
Clay loams  
Sandy clays  
Clays The hexenyl succinic anhydrides have been tested as soil granule stability agents with numerous soil series representative of most of these texture classes. In general, in common with other soil conditioning agents, they are more effective with soils of intermediate texture, and less effective with the sands and clays. In Table IV to follow, soil granule stability tests are given for all types of soil texture using hexenyl succinc anhydrides in comparison with a commercial soil conditioner which is reported to be the mixed calcium-sodium salt of a vinyl acetate-maleic anhydride copolymer ("Krilium" 6). In the table, the soil texture is given as well as the number of soils in each class tested. The results are an average of the test values for each class.

*Table IV.—Soil granule stability tests with different soils*

| Texture Class and Number of Soils Tested in each class | Percent Granule Retention | | |
| --- | --- | --- | --- |
| | Control | 0.1% 2-Ethylbutenyl-1 Succinic Anhydride | 0.1% "Krilium" 6 |
| Sands and loamy sands (4) | 23.85 | 40.08 | 36.55 |
| Sandy loams (4) | 26.15 | 80.35 | 53.85 |
| Fine Sandy loams (8) | 17.34 | 77.50 | 59.01 |
| Very fine sandy loams (2) | 8.1 | 89.60 | 46.20 |
| Loams (3) | 17.43 | 82.60 | 76.00 |
| Silt loams (26) | 8.01 | 68.70 | 61.22 |
| Silts (2) | 3.95 | 68.75 | 50.70 |
| Silty clay loams (4) | 4.93 | 78.25 | 41.50 |
| Silty clays (2) | 8.60 | 72.05 | 30.40 |
| Clay loams (42) | 26.86 | 72.07 | 52.70 |
| Clays (9) | 49.34 | 68.23 | 58.46 |

As with most of the soil conditioner materials tested, the greatest improvement in granule stability is to be found in those texture classes at the middle or loamy portion of the particle size distribution classification. Improvement in granule retention gradually drops off at either end of the texture curve. However, it should be noted that in the case of alkenyl succinic anhydride the very considerable improvement in granule stabilities is maintained over a much wider range of soil textures than with other soil conditioning materials.

One very valuable use of a soil conditioner is to prevent soil erosion. Outdoor tests have been run to determine the effectiveness of alkenyl succinic anhydride materials in preventing soil erosion. The test was conducted as follows:

Monongahela silt loam soil was mixed with 15% by weight of the dry soil of distilled water and one-tenth per cent of 2-ethylbutenyl-1 succinic anhydride soil conditioner. Ten parts per million of a wetting agent were added to facilitate incorporation of the conditioner into the soil, inasmuch as it was water-insoluble. Mixing was done in a laboratory sigma-blade mixer for 45 minutes, which pulverized the air-dried soil as it was mixed. The damp treated soil was then placed in a steel flat which measured 12 inches by 24 inches by 3 inches high, inside dimensions. This flat had a screen bottom consisting of coarse mesh expanded metal screen, over which was laid a 90-mesh stainless steel screen. This flat was placed outdoors, in contact and flush with the ground, which consisted of a B horizon Monongahela sandy loam. The flat was tilted on a 15° angle from the horizontal along its long axes, facing northwest (the direction of prevailing storms in the locality). This flat was exposed to the outdoor weather conditions prevailing at South Charleston, West Virginia for a six months' period between September and April. At the end of this period, the flat was dried and weighed to determine the extent of erosion loss from the soil flat. Whereas an untreated flat made up in the same manner lost soil at the rate of approximately 78 tons per acre per year, the erosion loss of the flat treated with the alkenyl succinic anhydride was too small to be measured. Its erosion loss was definitely less than 4 tons per acre per year.

The soil conditioner is effective at all soil moisture concentrations which exist in practice, but better results are obtained if the soil is neither very wet nor very dry. Moreover, the soil moisture content should preferably be below the plastic limit when the soil conditioner is added. If the soil moisture content is above the plastic limit when the conditioner is added, the soil tends to dry to a hard mass.

The plastic limit of a soil is defined as the lowest moisture content, expressed as a percentage of the weight of the oven dried soil, at which the soil can be rolled in threads one-eighth inch in diameter without the threads breaking into pieces. (A. S. T. M. D424–39 para. 1).

The following example shows the preparation of the soil conditioning agents of this invention:

*Example.—Alkenyl succinic anhydrides*: Maleic anhydride (22.5 lbs.) and 2-ethylbutene-1 (45 lbs.) were charged to a pressure-resistant vessel equipped for heating. The charge was heated for 24 hours at 195° C. under a pressure of 225 p. s. i. Distillation of the reaction products showed their composition to be 28.5% recovered 2-ethylbutene, 60% 2-ethylbutenyl-1 succinic anhydride and 6% residues.

2-Ethylbutenyl succinic anhydride has the following properties: B. P. 130° C. at 5 mm.; $d^{20}/_{20}$ 1.0669; $n_D^{30}$ 1.0669.

In a similar manner adducts of maleic anhydride with other olefins containing from five to eight carbon atoms were prepared. These alkenyl succinic anhydrides had the following boiling point ranges:

| Olefin | Alkenyl Succinic Anhydride Boiling Point Range, °C. |
|---|---|
| Pentene-1 | 110°/.55 mm. to 133°/4.4 mm. |
| Pentene-2 | 108°/8 mm. to 155°/7 mm. |
| 2-Methylbutene-1 | 109°/0.65 mm. to 142°/5 mm. |
| 2-Methylbutene-2 | 106°/1.4 mm. to 131°/4.8 mm. |
| Hexene-1 | 145°/5.4 mm. 149°/6.0 mm. |
| Hexene-2 | 125°/5.5 mm. to 140°/7 mm. |
| 4-Methylpentene-1 | 131°/7 mm. to 139°/7 mm. |
| 4-Methylpentene-2 | 135°/7 mm. to 133°/7 mm. |
| Heptene-2 | 143°/7 mm. to 149°/7 mm. |
| Heptene-3 | 146°/7 mm. to 154°/7 mm. |
| Octene-2 | 155°/8 mm. to 162°/9 mm. |
| 2,4,4-Trimethylpentene-1 | 145°/8.5 mm. to 165°/9 mm. |
| 2,4,4-Trimethylpentene-2 | 150°/7 mm. to 165°/8 mm. |

What is claimed is:

1. The method of improving the stability of granules of surface soils to the action of water which comprises incorporating in soil containing soil moisture from 0.005% to 1% based on said soil of one of the group consisting of alkenyl succinic acids and their anhydrides and salts, in which the alkenyl radical contains from five to eight carbon atoms.

2. The method of improving the stability of granules of agricultural soils to the action of water which comprises incorporating in soil containing soil moisture from 0.005% to 0.05% based on said soil of one of the group consisting of alkenyl succinic acids and their anhydrides and salts, in which the alkenyl radical contains from five to eight carbon atoms.

3. The method of improving the stability of granules of surface soils to the action of water which comprises incorporating in soil containing soil moisture from 0.005% to 0.2% based on said soil of one of the group consisting of alkenyl succinic acids and their anhydrides and salts, in which the alkenyl radical contains from five to eight carbon atoms.

4. The method of improving the stability of granules of surface soils to the action of water which comprises incorporating in soil containing soil moisture from 0.005% to 1% based on said soil of 2-ethylbutenyl succinic anhydride.

5. The method of improving the stability of granules of surface soils to the action of water which comprises incorporating in soil containing soil moisture from 0.005% to 1% based on said soil of 2-ethylbutenyl succinic acid.

6. The method of improving the stability of granules of surface soils to the action of water which comprises incorporating in soil containing soil moisture from 0.005% to 1% based on said soil of the sodium salt of 2-ethylbutenyl succinic acid.

7. The method of improving the stability of granules of surface soils to the action of water which comprises incorporating in soil containing soil moisture from 0.005% to 1% based on said soil of the calcium salt of 2-ethylbutenyl succinic acid.

8. The method of improving the stability of granules of surface soils to the action of water which comprises incorporating in soil containing soil moisture from 0.005% to 1% based on said soil of 2-methyl butenyl succinic anhydride.

9. The method of improving the stability of granules of surface soils to the action of water which comprises incorporating in soil containing soil moisture from 0.005% to 1% based on said soil of one of the group consisting of alkenyl succinic acids and their anhydrides and salts, said alkenyl succinic acids being of the structure

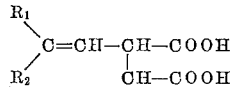

where $R_1$ is of the group consisting of hydrogen and alkyl and $R_2$ is alkyl, the sum of the carbon atoms in $R_1$ and $R_2$ being from three to six.

References Cited in the file of this patent

Lambe et al.: "Altering Soil Properties With Chemicals." Chem. & Engineering News, vol. 32, No. 6, pp. 488–492 (Feb. 8, 1954).